United States Patent [19]

Hashimoto et al.

[11] Patent Number: 5,044,665
[45] Date of Patent: Sep. 3, 1991

[54] PASSIVE SEAT BELT SYSTEM

[76] Inventors: Yoshito Hashimoto, 7-4-403, Nishitsuruma 1-chome, Yamato, Kanagawa, Japan, 242; Kazuo Yamamoto, 23-12, Sagamidai 7-chome, Sagamihara, Kanagawa, Japan, 228

[21] Appl. No.: 530,281

[22] Filed: May 30, 1990

[30] Foreign Application Priority Data

May 31, 1989 [JP] Japan ................ 1-63576[U]

[51] Int. Cl.$^5$ .............................. B60R 21/00
[52] U.S. Cl. .............................. 280/804; 297/473
[58] Field of Search .............. 280/804, 802, 808; 297/473

[56] References Cited

U.S. PATENT DOCUMENTS

| | | | |
|---|---|---|---|
| 4,717,174 | 1/1988 | Nishimura | 280/804 |
| 4,840,402 | 6/1989 | Yamamoto et al. | 280/804 |
| 4,889,363 | 12/1989 | Yamamoto et al. | 280/804 |

FOREIGN PATENT DOCUMENTS 63-111355 7/1988 Japan .
63-112163 7/1988 Japan .

OTHER PUBLICATIONS

U.S. Ser. No. 406,249 (Sep. 12, 1989) . . . inventor Kazuo Yamamoto is common to '249 application and the present application.

Primary Examiner—Kenneth R. Rice

[57] ABSTRACT

A passive seat belt system is constructed of a guide rail longitudinally defining a first channel and a second channel, a slider movable along the second channel of the guide rail, a webbing fastened to the slider and movable between an occupant-restraining position and an occupant-releasing position, a drive member for driving the slider, said drive member being received in the first channel of the guide rail, and a spacer provided between the slider and the drive member to prevent the slider from directly contacting an inner wall portion of the second channel, said inner wall portion being on a side closer to the first channel.

10 Claims, 9 Drawing Sheets

PASSIVE SEAT BELT SYSTEM

BACKGROUND OF THE INVENTION

1.) Field of the Invention

This invention relates to an occupant-protecting seat belt system for a motor vehicle, and specifically to a passive seat belt system of the type that an occupant-restraining webbing is fastened to a slider and the slider travels along a rail mounted on a part of a vehicle body so as to cause the webbing to approach or recede from the body of an occupant.

2.) Description of the Related Art

In a conventional passive seat belt system, a slider and a drive member are connected and the slider is caused to move between an occupant-restraining position and an occupant-releasing position, for example, by the opening or closure of an associated door. There are a variety of methods for the connection of the slider and the drive member.

Figure 7:
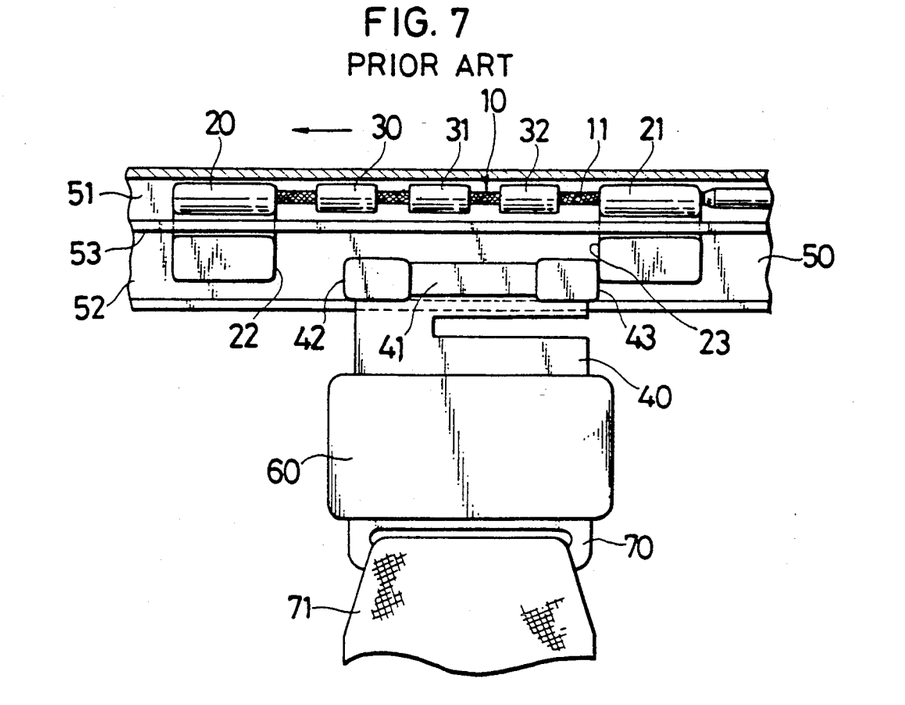
FIG. 7 illustrates the structural relationship among a rail, a slider and a drive member in a conventional passive seat belt system.

As is illustrated in FIG. 7 by way of example, a rail 50 defines a drive member channel 51, through which a drive member 10 extends, and a slider guide channel 52 along which a slider 40 moves.

The drive member 10 is composed of a wire 11, which is provided with drive blocks 20,21 and collars 30,31,32. The drive blocks 20,21 and collars 30,31,32 are arranged at suitable intervals. They are formed integrally with the wire 11. As an alternative, the wire is first caused to extends through them, followed by their fixing on the wire with self-locking nuts.

A webbing 71 is fastened to the slider 40 by way of an emergency release buckle (ERB) 60 and a tongue 70. An occupant is restrained or released in accordance with movements of the slider 40.

In the illustrated conventional passive seat belt system, the slider 40 is caused to move when the slider-contacting face 23 or 22 of the drive block 21 or 20 is brought into contact with a slider head 41, and the drive member is paid out or taken up by an unillustrated drive unit including a motor or the like.

Figure 8:
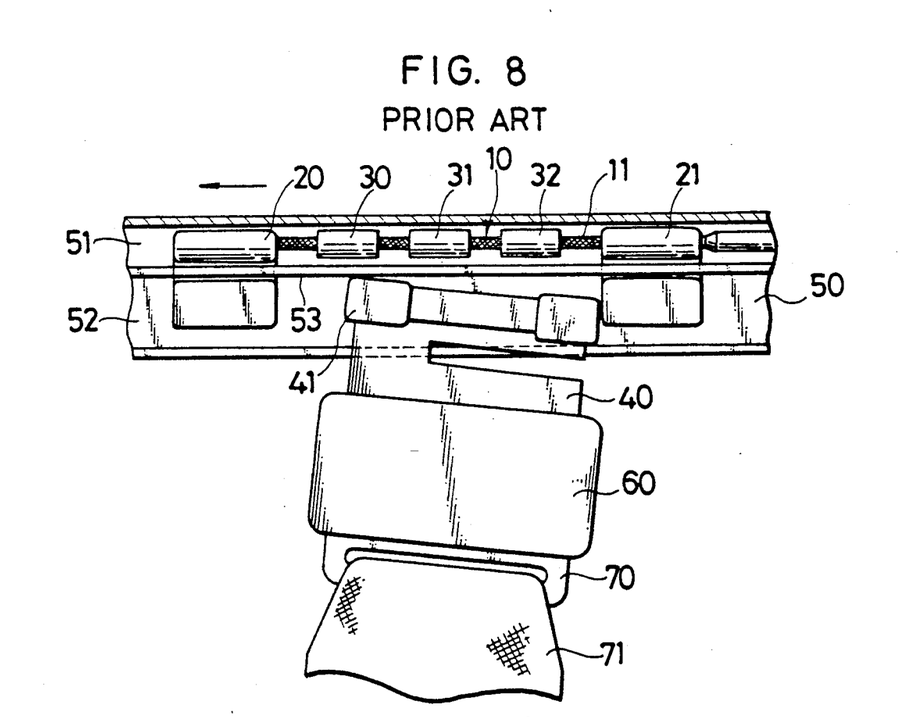
FIG. 8 is similar to FIG. 7 but shows the state of rattling of the slider in the conventional passive seat belt system.

In the above-described conventional example, the slider 40 is not fixed to the drive member 10 and is simply loose-fitted in the rail 50. When a force is applied to the slider 40 because of the roughness of an associated contacting surface, a variation in frictional resistance or the like and the slider 40 is swung, for example, upward or downward, a leading end face 42 or trailing end face 43 of the slider head 41 is brought into contact with the rail 50 (especially, an upper wall 53 of the slider guide channel 52. As a consequence, a frictional force is produced so that the smooth movement of the slider 40 is impaired or chattering or rattling noise and vibrations are developed (see FIG. 8).

SUMMARY OF THE INVENTION

With the foregoing in view, the present invention has as a primary object the provision of a passive seat belt system in which the above-described drawbacks of the conventional passive seat belt systems have been improved or solved.

In one aspect of the present invention, there is thus provided a passive seat belt system which comprises:

a guide rail longitudinally defining a first channel and a second channel, said first and second channels communicating with each other;

a slider movable along the second channel of the guide rail;

a webbing fastened to the slider and movable between an occupant-restraining position and an occupantreleasing position;

a drive member for driving the slider, said drive member being received in the first channel of the guide rail; and a means provided between the slider and the drive member to prevent the slider from directly contacting an inner wall portion of the second channel, said inner wall portion being on a side closer to the first channel.

Even when a force is applied to the slider due to the roughness of an associated contacting surface, a variation in frictional resistance or the like and the slider is swung vertically, laterally or axially, the slider head is brought into contact with the means provided between the slider and the drive member, whereby the slider head is prevented from undergoing a direct contact with the inner wall portion of the second channel, namely, an upper wall of the slider guide channel.

No frictional force is produced between the drive member and the slider, since the drive member moves in the same direction and at the same speed as the slider. The passive seat belt system according to the present invention therefore does not produce chattering noise and vibrations, and the slider is allowed to move smoothly.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

Various embodiments of the present invention will hereinafter be described with reference to the accompanying drawings, in which similar elements of structure to the corresponding elements in the conventional example are indicated by like reference numerals and their description is omitted herein.

Figure 1A:
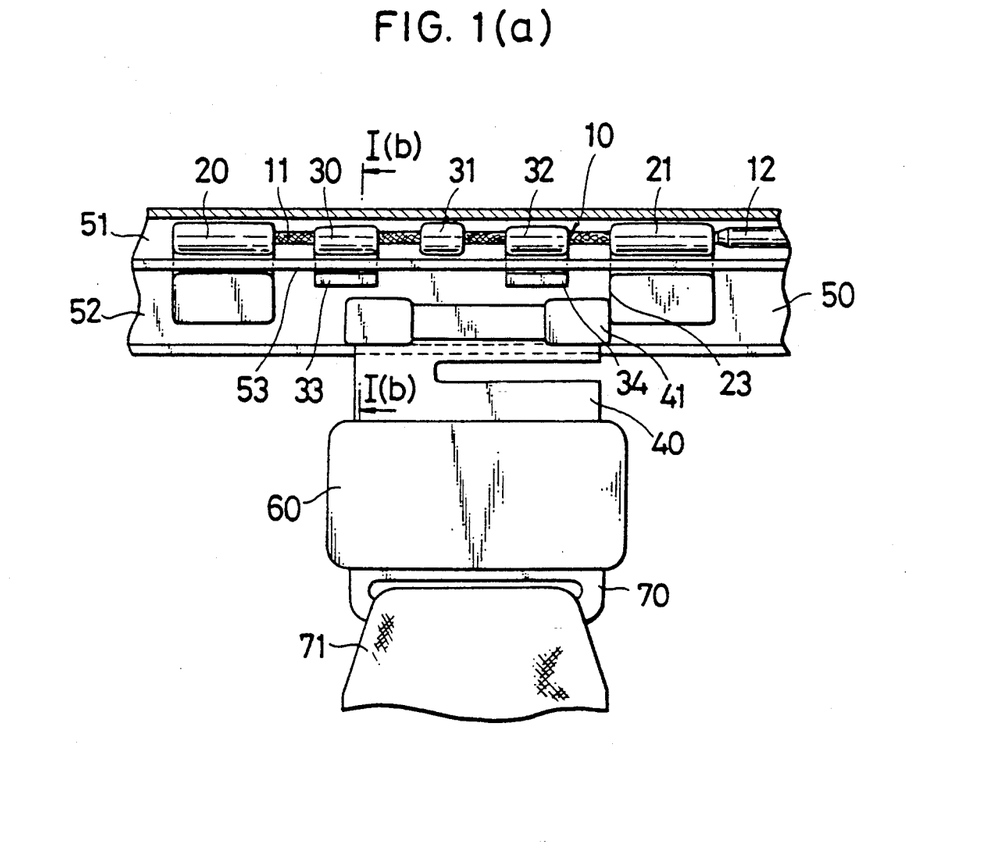
FIG. 1(a) illustrates the structural relationship among a rail, a slider, a drive member and a contact-preventing means in a passive seat belt system according to a first embodiment of the present invention.
Figure 1B:
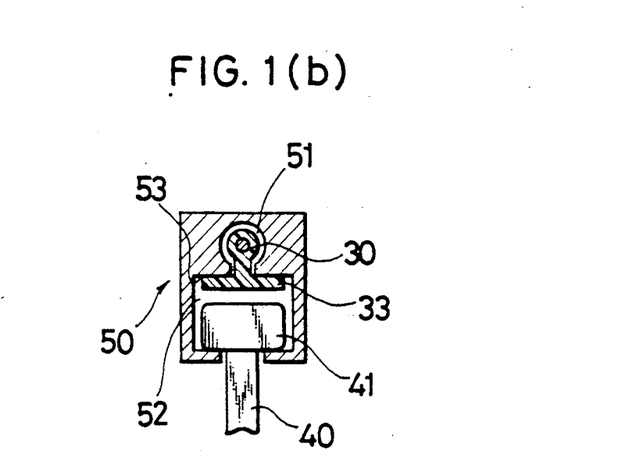
FIG. 1(b) is a fragmentary cross-sectional view of the passive seat belt system, taken in the direction of arrows I(b)—I(b) of FIG. 1(a)

Referring first to FIGS. 1(a) and 1(b) which illustrate a passive seat belt system according to a first embodiment of the present invention, a drive member channel 51 and a slider guide channel 52 are formed inside a rail 50. Received within the drive member channel 51 are a wire 11 as a drive member 10 as well as drive blocks 20,21 and collars 30,31,32, both attached to the wire 11. A slider 40 is movably received in the slider guide channel 52.

The wire 11 is applied with a synthetic resin cover 12 to reduce the frictional resistance between the wire 11 and the drive member channel 51. The cover 12 also serves to prevent the wire 11 from running off the drive member channel 51. The wire 11 is free of the cover 12 at the locations where the collars 30,31,32 and drive blocks 20,21 are provided.

The collars 30,31,32 and drive blocks 20,21 are formed of a synthetic resin which has low frictional resistance. They are mutually spaced at suitable intervals. The distance between the collars 30 and 32 is set somewhat shorter than the length of a slider head 41.

The collars 30,32 are provided at lower parts thereof with flanges 33,34, respectively and extend toward the side of the slider guide channel 52. The flanges 33,34 extends in the direction of the length of the rail 50 and also in the direction of the width of the slider guide channel 52. The lengths of these flanges 33,34 in the direction of the length of the rail 50 and in the direction of the width of the slider guide channel 52 are set at values such that the slider head 41 does not directly contact an upper wall 53 of the slider guide channel 52 even when a force is applied to the slider 40 due to the roughness of an associated contacting surface, a variation in frictional resistance or the like and the slider 40 is swung vertically, laterally or axially.

The slider 40 moves from an occupant-restraining position to an occupant-releasing position in the following manner. The occupant-releasing position is located in the front of an associated vehicle, namely, on the left-hand side as viewed in FIG. 1(a). First, a slider-contacting face 23 of the drive block 21 is brought into contact with a right-hand upright face of the slider head 41. The drive member 10 connected to an unillustrated drive motor is paid out leftward as viewed in FIG. 1(a), whereby the slider 40 is caused to move following the movement of the drive member 10.

Figure 1C:
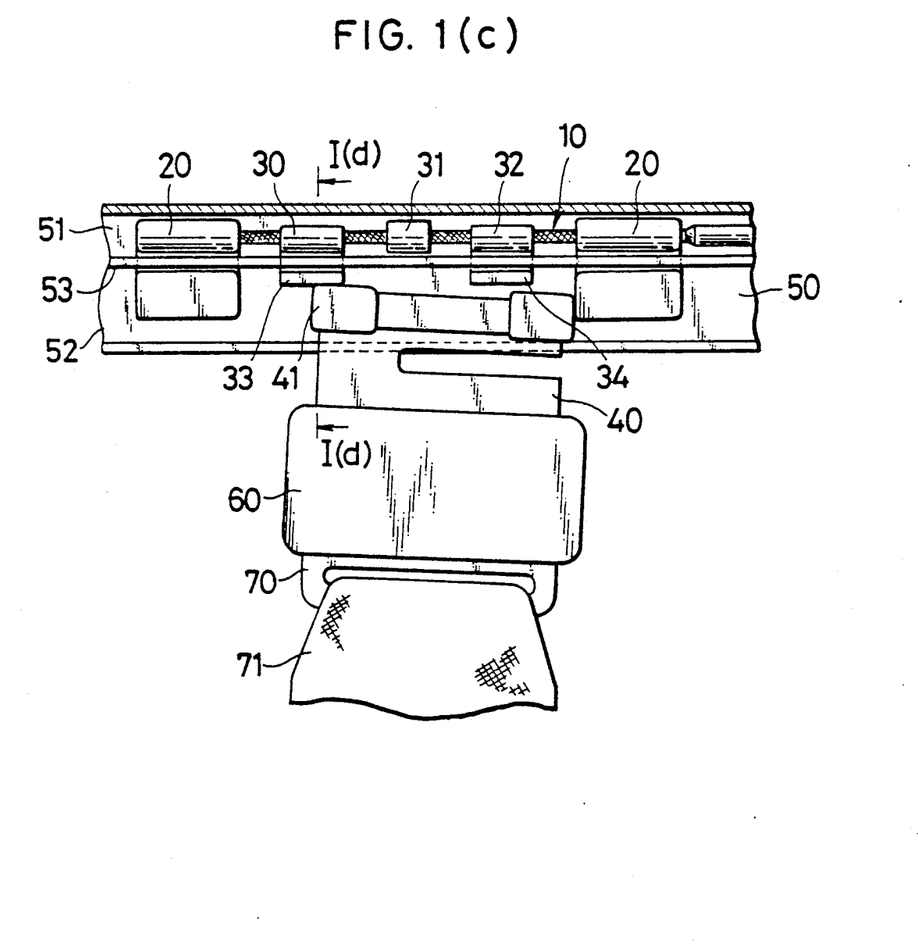
FIG. 1(c) is similar to FIG. 1(a) except that the slider has been swung vertically.
Figure 1D:
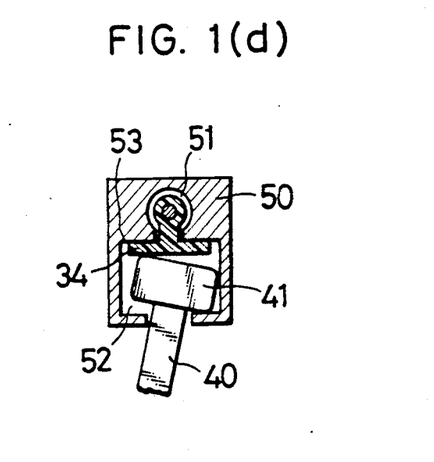
FIG. 1(d) is similar to FIG. 1(b) except that the slider has been swung laterally.

Even if a force is applied to the slider 40 at this time due to the roughness of a contacting surface, a variation in frictional resistance or the like and the slider 40 is swung vertically, laterally or axially, the slider head 41 is brought into contact with the flange 33 or 34 of the collar 30 or 32 made of the synthetic resin so that the slider head 41 does not directly contact the upper wall 53 of the slider guide channel 52 [see FIGS. 1(c) and 1(d)]. It is hence possible to avoid occurrence of chattering vibrations or noise which give unpleasant feeling to an occupant. It is to be noted that in FIG. 1(d), the left-hand side is the inboard side. Even when the slider 40 moves with the slider head 41 maintained in contact with the flange 33 or 34, chattering vibrations or noise does not occur and the slider 40 is still allowed to move smoothly because the slider 40 runs without rattling.

Figure 2A:
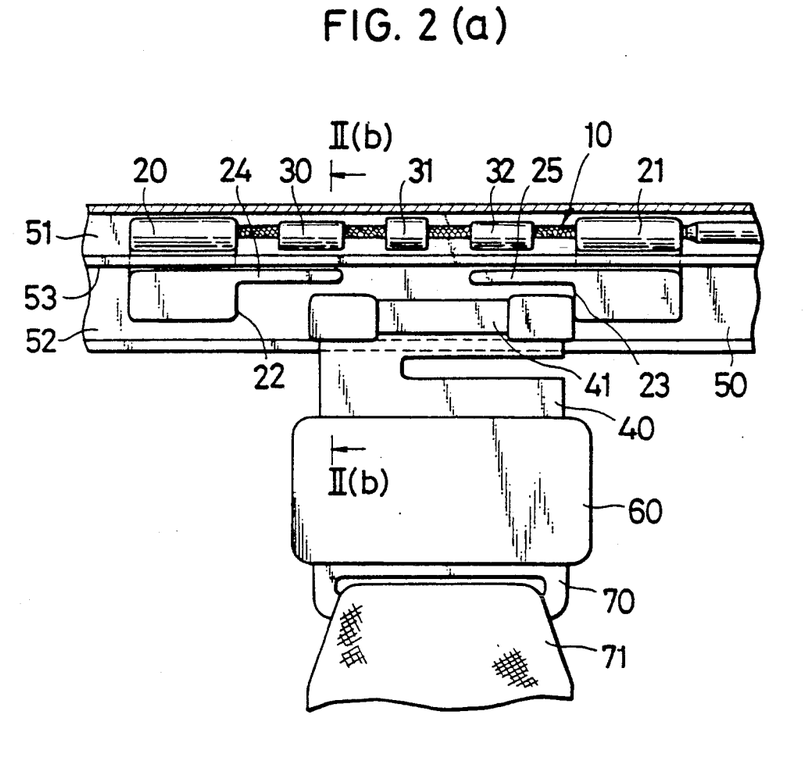
FIG. 2(a) shows the structural relationship among a rail, a slider, a drive member and a contact-preventing means in a passive seat belt system according to a second embodiment of the present invention.
Figure 2B:
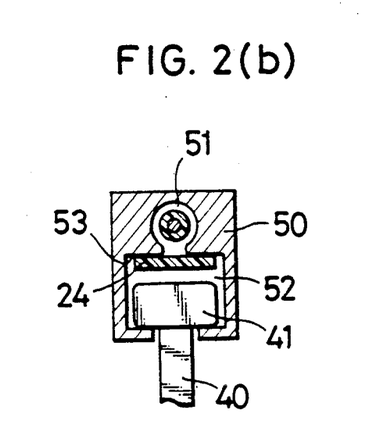
FIG. 2(b) is a fragmentary cross-sectional view of the passive seat belt system of the second embodiment, taken in the direction of arrows II(b)—II(b) of FIG. 2(a)

A passive seat belt system according to a second embodiment of the present invention will next be described with reference to FIGS. 2(a) and 2(b).

The second embodiment is similar to the first embodiment in that a wire 11 is provided with drive blocks 20,21 and collars 30,31,32. In the second embodiment, extensions 24,25 are provided on slider-contacting portions 22,23 of the drive blocks 20,21 instead of providing the collars with flanges. The extensions 24,25 extend along an upper wall 53 of a slider guide channel 52 and also project from a drive member channel 51 toward the side of the slide guide channel 52. The extensions 24,25 are provided in such a way that they confront each other on the side of the upper wall 53 of the slider guide channel 52. The length an width of the extensions 24 and 25 and the distance therebetween are set in such a way that a slider head 41 does not directly contact the upper wall 53 of the slider guide channel 52 even when a slider 40 is swung vertically, laterally or axially as a result of application of a force thereto due to the roughness of a contacting surface, a variation in frictional resistance or the like while the slider head 41 is in contact with one of the drive blocks, for example, the left-hand drive block 20 as depicted in FIG. 2(a).

Even when the slider 40 is swung vertically, laterally or axially as a result of application of a force thereto due to the roughness of the contacting surface, a variation in frictional resistance or the like, the slider head 41 contacts the extension 24 or 25 of the drive block 20 or 21 owing to the construction described above. The slider head 41 therefore does not directly contact the upper wall 53 of the slider guide channel 52, so that occurrence of chattering vibrations or noise unpleasant to an occupant can be avoided and the slider 40 is allowed to move smoothly.

The slider 40 is still allowed to move without rattling even when the slider head 41 travels while being maintained in contact with the extension 24 or 25. Chattering vibration or noise does not occur either, and the slider 40 is also allowed to move smoothly.

Figure 3A:
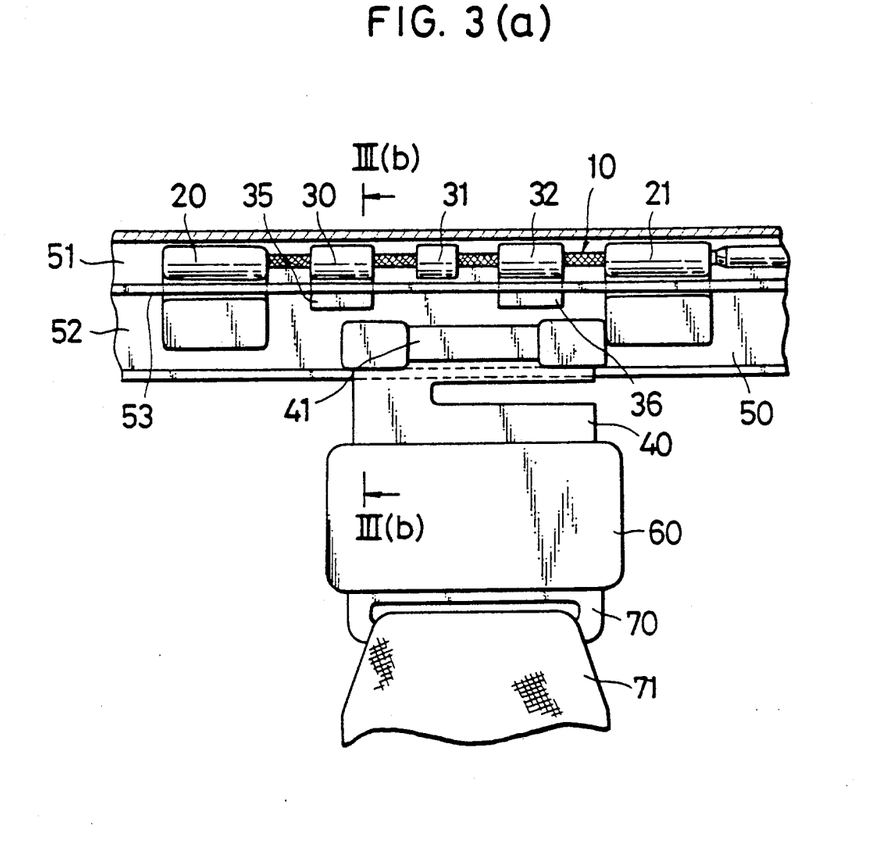
FIG. 3(a) depicts the structural relationship among a rail, a slider, a drive member and a contact-preventing means in a passive seat belt system according to a third embodiment of the present invention.
Figure 3B:
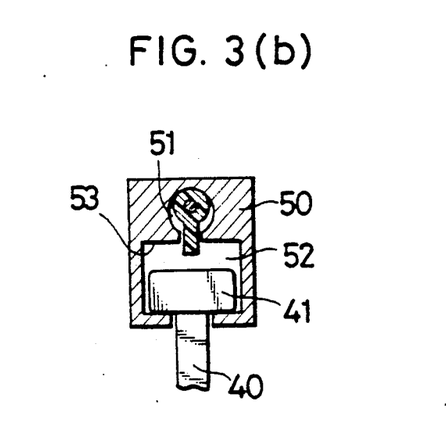
FIG. 3(b) is a fragmentary cross-sectional view of the passive seat belt system of the third embodiment, taken in the direction of arrows III(b)—III(b) of FIG. 3(a)

A passive seat belt system according to a third embodiment of the present invention is now described with reference to FIGS. 3(a) and 3(b).

The third embodiment is different from the first embodiment in that the flanges 33,34 of the collars 30,32 in the first embodiment do not extend laterally and are formed as flanges 35,36 extending only in the direction of the length of the rail 50. The length of extension of the flanges 35,36 toward the side of a slider guide channel 52 is set in such a way that even when a force is applied to a slider 40 due to the roughness of a contacting surface, a variation in frictional resistance or the like and the slider 40 is hence swung vertically, laterally or axially, a slider head 41 does not directly contact an upper wall 53 of the slider guide channel 52.

The third embodiment can also about similar effects and advantages to the first embodiment.

Figure 4A:
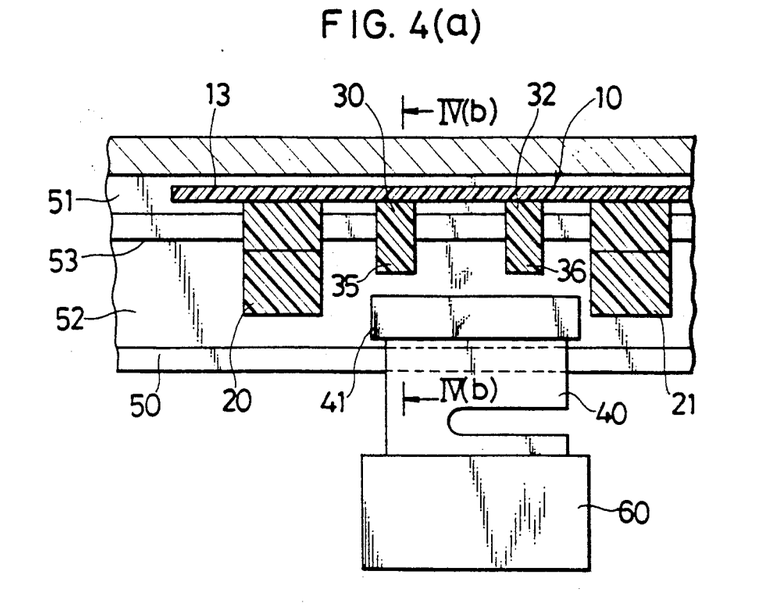
FIG. 4(a) shows the structural relationship among a rail, a slider, a drive member and a contact-preventing means in a passive seat belt system according to a fourth embodiment of the present invention.
Figures 4B, 4C:
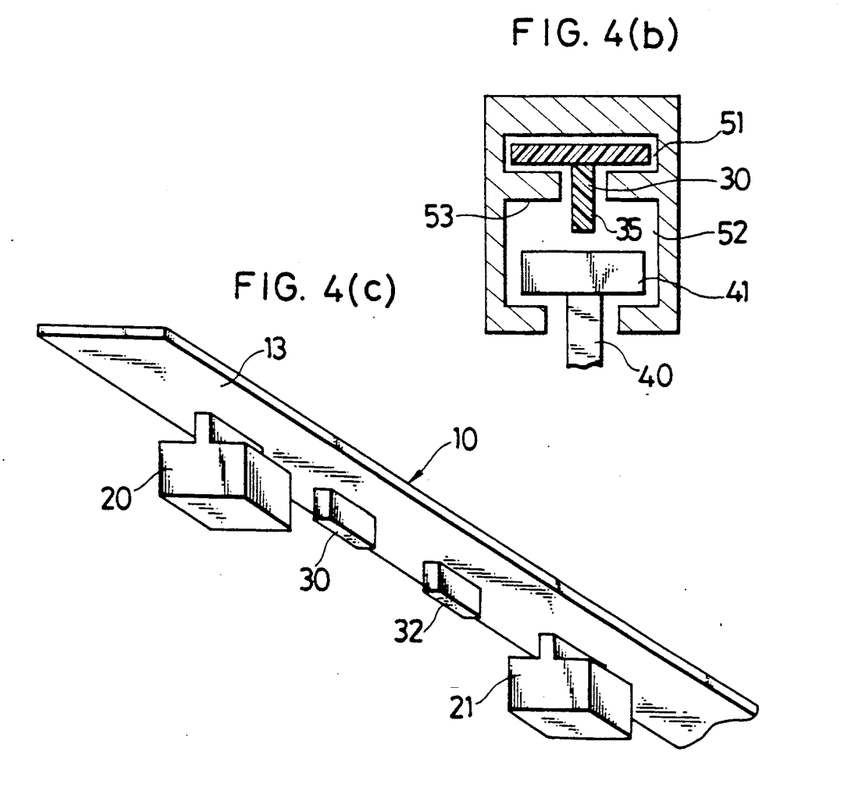
FIG. 4(b) is a fragmentary cross-sectional view of the passive seat belt system of the fourth embodiment, taken in the direction of arrows IV(b)—IV(b) of FIG. 4(a)
FIG. 4(c) is a fragmentary perspective view of the drive member in the passive seat belt system of the fourth embodiment.

Referring now to FIGS. 4(a) through 4(c), a passive seat belt system according to a fourth embodiment of the present invention will be described.

In the fourth embodiment, as the drive member 10, a tape 13 is used instead of a wire. Drive blocks 20,21 are integrally provided with the tape 13. Further, plural collars (two collars 30,32 in the drawings) are also integrally provided at a suitable interval with the tape 13.

The collars 30,32 have flanges 35,36, respectively. These flanges 35,36 extend toward the side of a slider guide channel 52. Similar to the preceding embodiments, the flanges 35,36 extend to a length such that even when a force is applied to a slider 40 due to the roughness of a contacting surface, a change in frictional resistance or the like and the slider is hence swung vertically, laterally or axially, a slider head 41 does not directly contact an upper wall 53 of the slider guide channel 52.

The fourth embodiment can also about similar effects and advantages to the preceding embodiments.

Figure 5A:
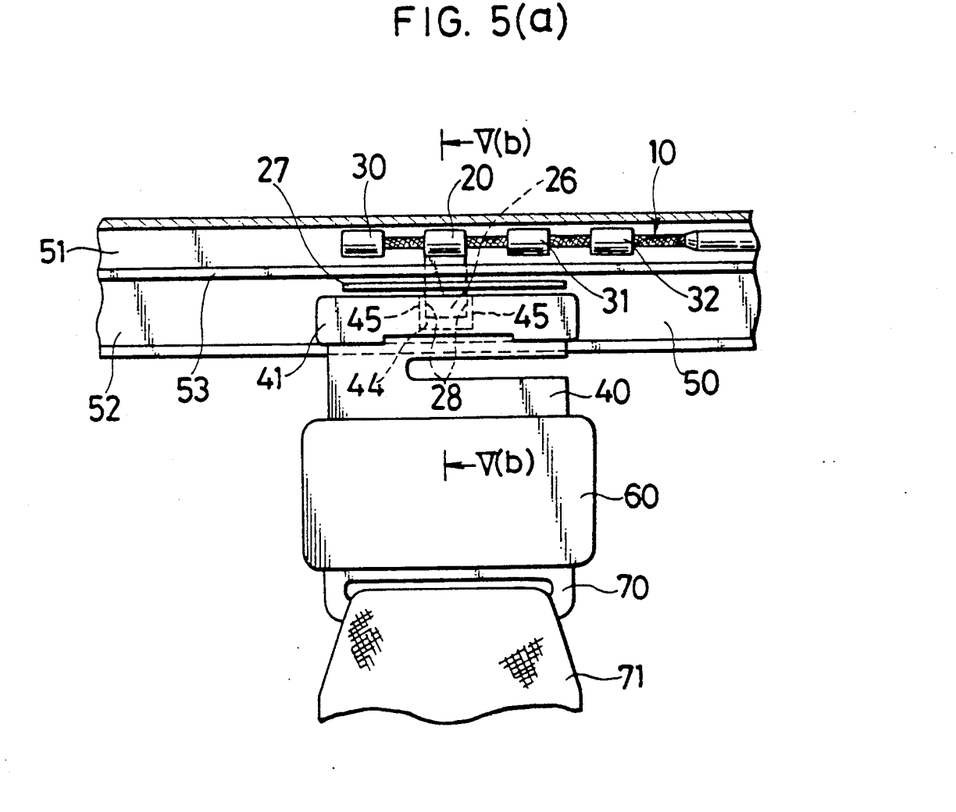
FIG. 5(a) shows the structural relationship among a rail, a slider, a drive member and a contact-preventing means in a passive seat belt system according to a fifth embodiment of the present invention.
Figure 5B:
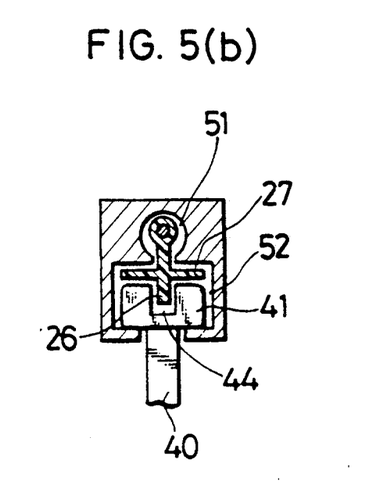
FIG. 5(b) is a fragmentary cross-sectional view of the passive seat belt system of the fifth embodiment, taken in the direction of arrows V(b)—V(b) of FIG. 5(a)

FIGS. 5(a) and 5(b) show a passive seat belt system according to a fifth embodiment of the present invention, in which a slider is driven in a different manner.

The fifth embodiment is similar to the preceding embodiments in that it includes a wire 11 as the drive member 10 and collars 30,31,32 provided on the wire 11. However, only one drive block 20 is provided.

The drive block 20 has an extension 26 projecting toward the side of a slider guide channel 52 and a flange 27 formed on the extension 26 on the side of an upper wall 53 of the slider guide channel 52. The drive block 20 is integrally formed with the wire 11.

The flange 27 is formed to extend in the direction of the length of a rail 50, to have a length somewhat shorter than a slider head 41, and also to extend in the direction of the width of the rail 50, so that even when a force is applied to a slider 40 due to the roughness of a contacting surface, a change in frictional resistance or the like and the slider is hence swung vertically, laterally or axially, the slider head 41 does not directly contact the upper wall 53 of the slider guide channel 52.

A bore 44 somewhat greater than the extension 26 of the drive block 20 is formed in the slider head 41.

Engagement between the slider 40 and the drive block 20 is achieved by fitting the extension 26 of the drive block 20 in the bore 44 formed in the slider head 41.

An upright wall 45 of the bore 44 in the slider 40 is brought into contact with an upright wall 28 of the extension 26 of the drive block 20 when the drive member 10 is paid out, whereby the slider 40 is caused to move following the movement of the drive member 10.

The fifth embodiment can also about similar effects and advantages to the preceding embodiments.

Figure 6A:
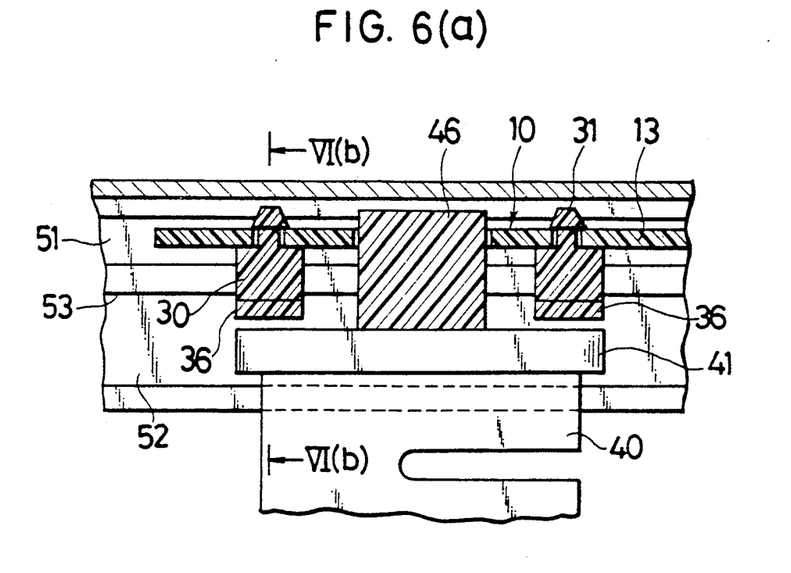
FIG. 6(a) shows the structural relationship among a rail, a slider, a drive member and a contact-preventing means in a passive seat belt system according to a sixth embodiment of the present invention.
Figure 6B:
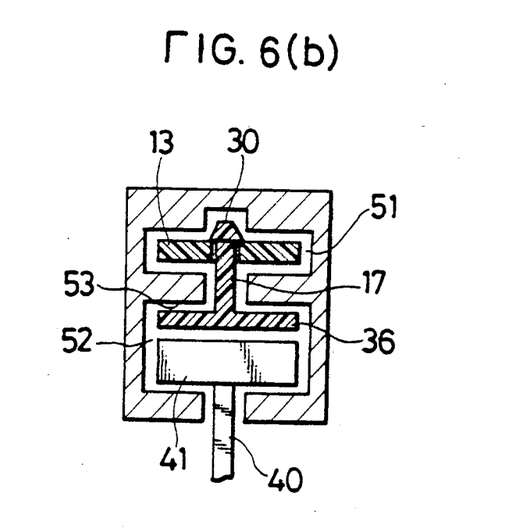
FIG. 6(b) is a fragmentary cross-sectional view of the passive seat belt system of the sixth embodiment, taken in the direction of arrows VI(b)-VI(b) of FIG. 6(a)
Figure 6C:
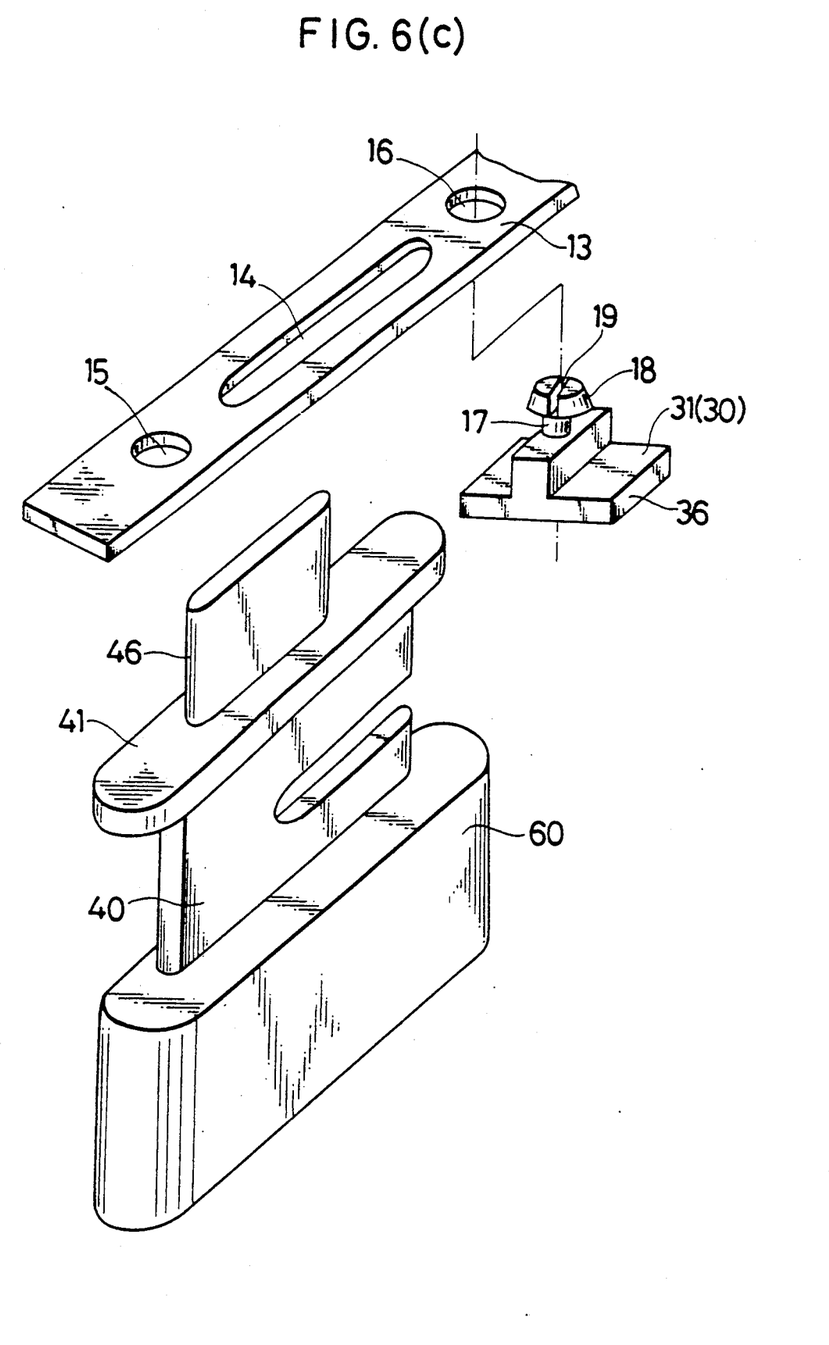
FIG. 6(c) is an exploded fragmentary perspective view of the rail, slider, drive member and contact-preventing means in the passive seat belt system of the sixth embodiment of the present invention.

FIGS. 6(a) through 6(c) illustrate a passive seat belt system according to a sixth embodiment of the present invention, in which a slider is driven in a still different manner.

A tape 13 as the drive member 10 has drive blocks 30,31 and defines a slot 14 therethrough. Through the tape 13, there ar formed the slot 14, which extends in a lengthwise direction, and circular holes 15,16 near both longitudinal ends of the slot 14, respectively.

Drive blocks 30,31 are attached to the circular holes 15,16, respectively. The manner of the attachment is optional. In the drawing, each drive block is in the form of a bolt having a stem 17 and a head 18 whose diameter is greater than that of the stem 17. A slit 19 is formed in the head 18.

The diameter of the head 18 has a size such that the head 18 can be inserted into the corresponding circular hole 15 or 16 when the head 18 is pinched to narrow down the slit 19. The head 18 is upwardly fitted in the corresponding circular hole 15 or 16 and the slit 19 is then allowed to have the original width, whereby the diameter of the head 18 becomes greater than that of the corresponding circular hole 15 or 16 and the head 18 does not slip out of the corresponding circular hole 15 or 16.

The drive blocks 30,31 have flanges 36,36 which extend in the directions of both the width and length of a slider guide channel 52.

The width and length of the flanges 36,36 of the drive blocks 30,31 are set at values such that a slider head 41 does not directly contact an upper wall 53 of a slider guide channel 52 even when a force is applied to a slider 40 due to the roughness of an associated contacting surface, a variation in frictional resistance or the like and the slider 40 is hence swung vertically, laterally or axially.

An elongated ridge 46 is provided centrally on the slider head 41 of the slider 40. The elongated ridge 46 extends in the direction of the length of the slider head 46. The elongated ridge 46 has a cross-sectional area somewhat smaller than the slot 14 of the tape 13.

Engagement between the slider 40 and the tape 13 is achieved by fitting the ridge 46 of the slider head 41 in the slot 14 of the taper 13.

The sixth embodiment can also bring about similar effects and advantages to the preceding embodiments.

What is claimed is:

1. A passive seat belt system comprising:
 a guide rail longitudinally defining a first channel and a second channel, said first and second channels communicating with each other;
 a slider movable along the second channel of the guide rail;
 a webbing fastened to the slider and movable between an occupant-restraining position and an occupant-releasing position;
 a drive member for driving the slider, said drive member being received in the first channel of the guide rail; and
 means provided between the slider and the drive member for preventing the slider from directly contacting an inner wall portion of the second channel, said inner wall portion being on a side closer to the first channel;

wherein the preventing means has at least one collar provided integrally with the drive member;

wherein the collar extends at a free end portion into the second channel; and wherein the free end portion of the collar is broader than a strait portion, through which the first and second channels communicated with each other, as viewed in a transverse cross-section of the second channel.

2. A passive seat belt system comprising:

a guide rail longitudinally defining a first channel and a second channel, said first and second channels communicating with each other;

a slider movable along the second channel of the guide rail;

a webbing fastened to the slider and movable between an occupant-restraining position and an occupant-releasing position;

a drive member for driving the slider and the drive member for preventing the slider from directly contacting an inner wall portion of the second channel, said inner wall portion being on a side closer to the first channel;

wherein the drive member is provided with engagement means adapted to be brought into contact with the slider to drive the slider, and wherein the preventing means is formed on the engagement means.

3. The system of claim 2, wherein the engagement means comprises two drive blocks spaced from each other at an interval broader than the length of the slider as viewed in the direction of the length of the drive member, and the preventing means comprises extensions extending in mutually-approaching directions from the respective drive blocks in the second channel.

4. The system of claim 3, wherein the extensions are broader than a strait portion, through which the first and second channels communicate with each other, as viewed in a transverse cross-section of the second channel.

5. The system of claim 2, wherein the slider has a slider head received in the second channel and defining a bore, the engagement means of the drive member is engageable with the bore, and the preventing means is a flange provided on the engagement means.

6. The system of claim 5, wherein the flange is broader than a straight portion, through which the first and second channels communicate with each other, as viewed in a transverse cross-section of the second channel.

7. A passive seat belt system comprising:

a guide rail longitudinally defining a first channel and a second channel, said first and second channels communicating with each other;

a slider movable along the second channel of the guide rail;

a webbing fastened to the slider and movable between an occupant-restraining position and an occupant-releasing position;

a drive member for driving the slider, said drive member being received in the first channel of the guide rail; and means provided between the slider and the drive member for preventing the slider from directly contacting an inner wall portion of the second channel, said inner wall portion being on a side closer to the first channel;

wherein the preventing means has at least one collar provided integrally with the drive member; and wherein the slider is provided with a ridge projecting into the first channel, and the drive member defines a slot in which the ridge is received.

8. In a passive seat belt system of the type that a slider for carrying a webbing is slidably received in a guide rail and is selectively moved between an occupant-restraining position and an occupant-releasing position, the improvement wherein the system further comprises, on a side of a slider head farthest from a webbing-fastened portion of the slider, a means for preventing the slider from directly contacting the guide rail, and said preventing means is movable together with the slider along the guide rail; wherein the system further comprises a drive member for driving the slider, and wherein the preventing means is provided integrally with the drive member.

9. The system of claim 8, wherein the guide rail defines a first channel for guiding the drive member and a second channel for guiding the slider, the first and second channels communicate with each other, and the preventing means is provided in the second channel.

10. A passive seat belt system comprising:

a guide rail longitudinally defining a first channel and a second channel, said first and second channels communicating with each other through a strait portion defined in the rail;

a slider movable along the second channel of the guide rail;

a webbing fastened to the slider and movable between an occupant-restraining position and an occupant-releasing position;

a drive member for driving the slider, said drive member being received in the first channel of the guide rail; and a contact-preventing member provided in the strait portion of the guide rail and separating the slider and the drive member from each other at plural locations relative to the direction of movement of the slider, the slider bearing prevented by the contact-preventing member from directly contacting an inner wall portion of the second channel, said inner wall portion being on a side closer to the first channel;

wherein the contact-preventing member is provided integrally with the drive member and extends at a free end portion into the second channel.

* * * * *

UNITED STATES PATENT AND TRADEMARK OFFICE
CERTIFICATE OF CORRECTION

PATENT NO. : 5,044,665
DATED      : September 3, 1991
INVENTOR(S) : Yoshito HASHIMOTO, Kazuo YAMAMOTO It is certified that error appears in the above-identified patent and that said Letters Patent is hereby corrected as shown below:

On the Title page, please insert the following:

[73] Assignee:  Nippon Seiko Kabushiki Kaisha
                Tokyo, Japan

Signed and Sealed this

Fifteenth Day of December, 1992

Attest:

DOUGLAS B. COMER

Attesting Officer

Acting Commissioner of Patents and Trademarks